United States Patent
Kim et al.

(10) Patent No.: US 11,654,741 B2
(45) Date of Patent: May 23, 2023

(54) CARGO PACKAGING SYSTEM FOR MOBILITY VEHICLE AND CONTROL METHOD THEREFOR

(71) Applicants: Hyundai Motor Company, Seoul (KR); Kia Corporation, Seoul (KR)

(72) Inventors: Kye Yoon Kim, Gunpo-si (KR); Choung Hyoung Kim, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 67 days.

(21) Appl. No.: 17/379,689

(22) Filed: Jul. 19, 2021

(65) Prior Publication Data
US 2022/0185058 A1  Jun. 16, 2022

(30) Foreign Application Priority Data
Dec. 15, 2020 (KR) .................. 10-2020-0175422

(51) Int. Cl.
*B60H 1/00* (2006.01)

(52) U.S. Cl.
CPC ..... *B60H 1/00014* (2013.01); *B60H 1/00392* (2013.01); *B60H 1/00878* (2013.01)

(58) Field of Classification Search
CPC ............ B60H 1/00014; B60H 1/00357; B60H 1/00398; B60H 1/00878; B64D 9/00; B64D 13/06; B64D 2013/0603; B64D 2013/0629; B64C 2201/128; B64C 39/24; B60P 7/06; B60P 7/16; F25D 11/003
See application file for complete search history.

(56) References Cited

U.S. PATENT DOCUMENTS

| | | | | |
|---|---|---|---|---|
| 2,856,867 A | * | 10/1958 | Dasey | B61D 45/008 206/522 |
| 2,960,942 A | * | 11/1960 | Pier | B61D 45/008 410/119 |
| 3,098,455 A | * | 7/1963 | McElroy | B61D 45/008 410/125 |
| 3,749,268 A | * | 7/1973 | Macomber | B60P 1/64 414/679 |
| 3,847,091 A | * | 11/1974 | Holt | B61D 45/008 410/128 |
| 7,043,932 B2 | | 5/2006 | Tofflemire | |
| 7,975,963 B2 | * | 7/2011 | Merz | B64D 9/00 410/87 |

(Continued)

FOREIGN PATENT DOCUMENTS

KR 10-2064239 B1 1/2020
WO WO 2017/039404 A2 3/2017

*Primary Examiner* — Marc E Norman
(74) *Attorney, Agent, or Firm* — Morgan, Lewis & Bockius LLP (57) ABSTRACT

A cargo packaging system for a mobility vehicle may include a housing mounted on the mobility vehicle; a plurality of air cushions provided at a plurality of positions on an internal surface of the housing, and applying a pressure to and cushioning the cargo accommodated in the housing in a plurality of directions during expansion thereof; an air charging part connected to the plurality of air cushions and configured for injecting gas into each air cushion of the housing and controlling a flow rate or a pressure of the injected gas; and an outlet controlled by the air charging part and discharging the gas injected into each air cushion to the outside of the outlet.

16 Claims, 4 Drawing Sheets

(56) References Cited

U.S. PATENT DOCUMENTS

| | | | |
|---|---|---|---|
| 10,688,907 B2 * | 6/2020 | Freeman | B60P 7/065 |
| 2013/0145460 A1 * | 6/2013 | Dudley | B60H 1/0065 |
| | | | 726/21 |
| 2019/0047463 A1 * | 2/2019 | Rizkallah | B60P 7/065 |

* cited by examiner

CARGO PACKAGING SYSTEM FOR MOBILITY VEHICLE AND CONTROL METHOD THEREFOR

CROSS REFERENCE TO RELATED APPLICATION

The present application claims priority to Korean Patent Application No. 10-2020-0175422, filed Dec. 15, 2020, the entire contents of which is incorporated herein for all purposes by this reference.

BACKGROUND OF THE INVENTION

Field of the Invention

The present invention relates to a cargo packaging system for a mobility vehicle that transports cargo and the like and a control method therefor.

Description of Related Art

Recently, in urban areas, types and power sources of transportation are diversifying, ranging from personal transportation means such as hoverboards and electric kickboards to public transportation that utilizes electricity as a power source. Since these mobility vehicles eliminate the traffic congestion during rush hours in a city, and do not generate pollutants such as NOx, SOx, and CO because of not using internal combustion engines, the mobility vehicles are environmentally friendly.

In recent years, with the development of battery technology, research and development on an air mobility vehicle configured for travelling beyond the limits of the ground has been actively promoted. Since the air mobility vehicle is configured to take off and land vertically by use of a high-power battery and does not require a separate runway, the air mobility vehicle is suitable for use in crowded urban areas and expected to be commercialized in the near future.

Furthermore, such mobility vehicles are driven unmanned as autonomous driving technologies develop, reducing labor costs, and such technologies may be applied not only when transporting people but also when transporting cargo.

The present technology relates to a system for packaging and transporting cargo to a destination in various mobility vehicles and a control method therefor.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a system facilitating various mobility vehicles to be driven unmanned to safely and rapidly transport cargo.

According to various exemplary embodiments of the present invention for achieving the above objective, a cargo packaging system for a mobility vehicle includes: a housing having an internal space therein for accommodating cargo and mounted on the mobility vehicle; a plurality of air cushions provided at a plurality of positions on an internal surface of the housing, and applying a pressure to and cushioning the cargo accommodated in the housing in a plurality of directions during expansion thereof; an air charging part connected to the plurality of air cushions and configured for injecting gas into each air cushion of the housing and controlling a flow rate or a pressure of the injected gas; and an outlet controlled by the air charging part and discharging the gas injected into each air cushion to the outside of the outlet.

The mobility vehicle may further include a heat exchanger for heating or cooling the gas injected into each air cushion through heat exchange.

A temperature sensor may be provided inside the housing or in each air cushion, and the heat exchanger may control a degree of heating or cooling according to values of temperature measured by the temperature sensor.

A cooler for cooling the supplied gas may be provided between the air charging part and each air cushion, and a heating element may be provided in each air cushion at a portion thereof in contact with the cargo.

The housing may be mounted in an internal space of the mobility vehicle, and at a lower portion of the mobility vehicle, the air charging part may be provided below a point where the housing is positioned.

The mobility vehicle may further include a gas storage tank that stores the gas to be injected into each air cushion and supplies the gas to the air charging part.

One or more of the plurality of air cushions may be connected to the air charging part to receive the supplied gas, and the plurality of air cushions may be connected to each other, to have the same internal pressure thereof.

The plurality of air cushions may be independent air cushions that are not connected to each other, and each air cushion may independently receive the gas from each corresponding air charging part.

A pressure sensor may be provided in each of the plurality of air cushions, and the air charging part may control the gas supplied to each air cushion according to an internal pressure of each air cushion, to adjust a condition of the cargo.

As a method of controlling a cargo packaging system for a mobility vehicle of claim 1, the method includes: loading cargo in an internal space of a housing; injecting gas into an air cushion through an air charging part and fixing the cargo inside the housing; and releasing the fixing of the cargo by discharging the gas injected into the air cushion through an outlet when transportation of the cargo is completed.

The method may further include heating or cooling the gas through a heat exchanger included in the mobility vehicle.

The method may further include detecting a change of a pressure in each air cushion by a pressure sensor provided in each of the plurality of air cushions; and controlling the gas supplied to each air cushion depending on the pressure inside of each air cushion by the air charging part.

According to the cargo packaging system for the mobility vehicle and the control method therefor of the present invention, even when the mobility vehicle is driven unmanned, the cargo may be stably secured. Moreover, even when the cargo is tilted or a loading condition of the cargo is unstable while the mobility vehicle is driving to a destination, the case may be corrected accordingly, or even when the cargo being transported requires heating or cooling, the cargo may be transported, whereby there is an effect in that transport is possible regardless of the size or the characteristics of the cargo.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a cargo packaging system for a mobility vehicle according to various exemplary embodiments of the present invention will be described in detail.

Figure 1:
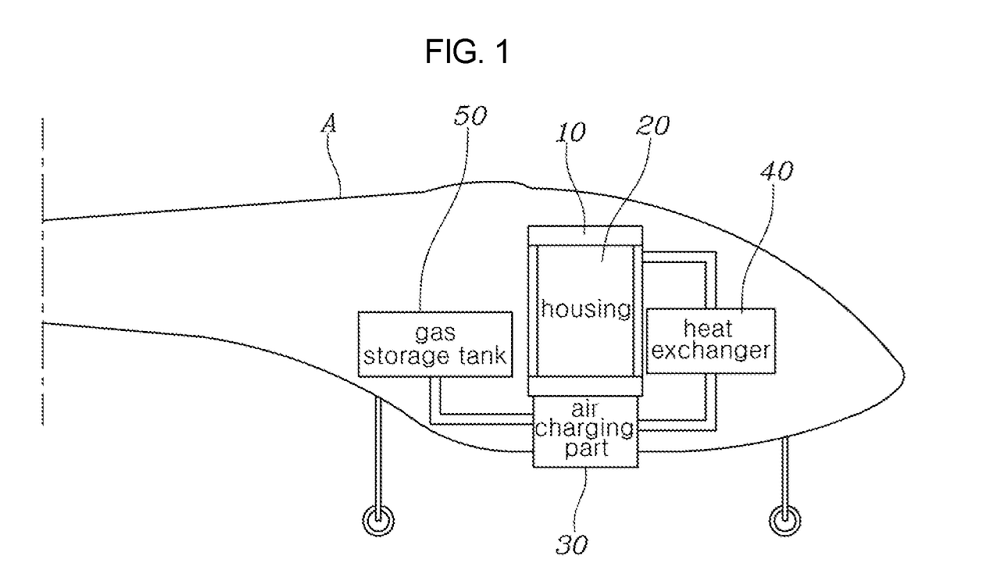
FIG. 1 is a view showing a cargo packaging system for a mobility vehicle, the system being applied to an air mobility vehicle according to various exemplary embodiments of the present invention.
Figure 2:
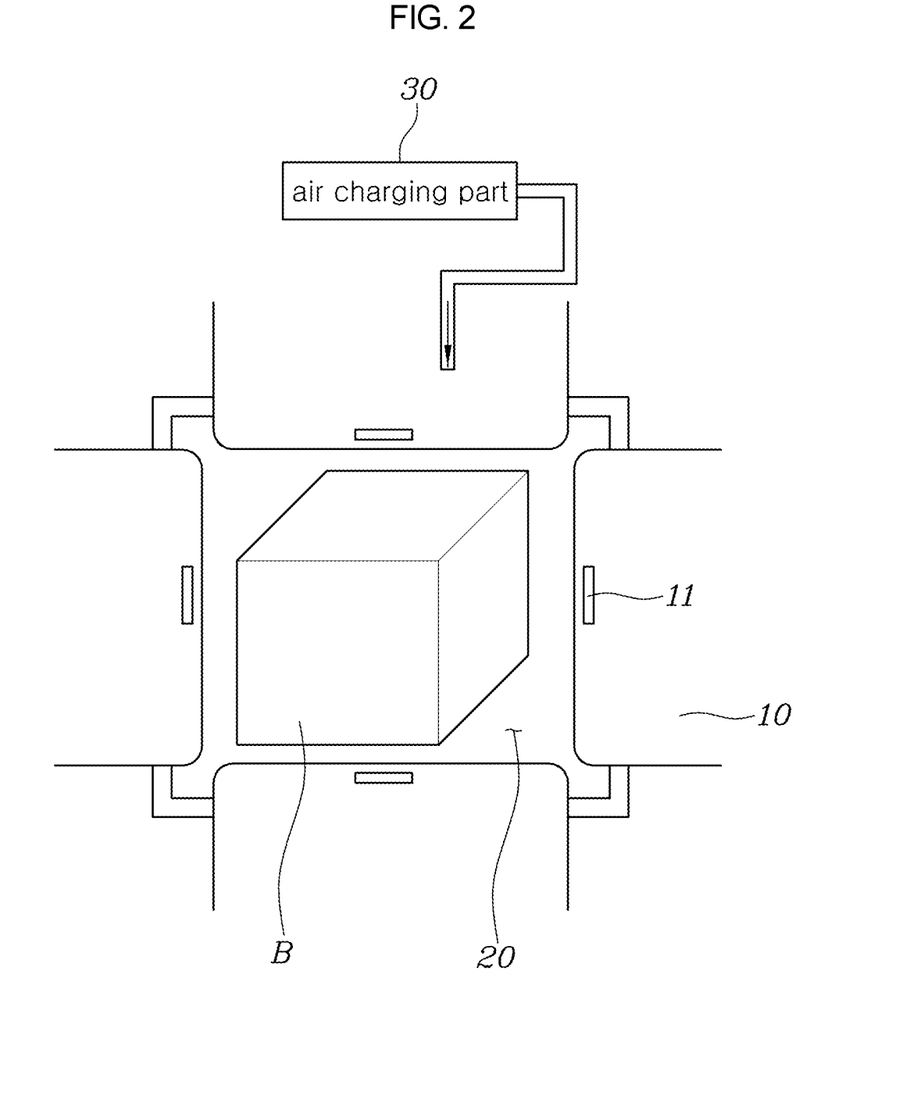
FIG. 2 is a view showing the cargo packaging system for the mobility vehicle, the system having a plurality of air cushions connected to each other according to the exemplary embodiment of the present invention.
Figure 3:
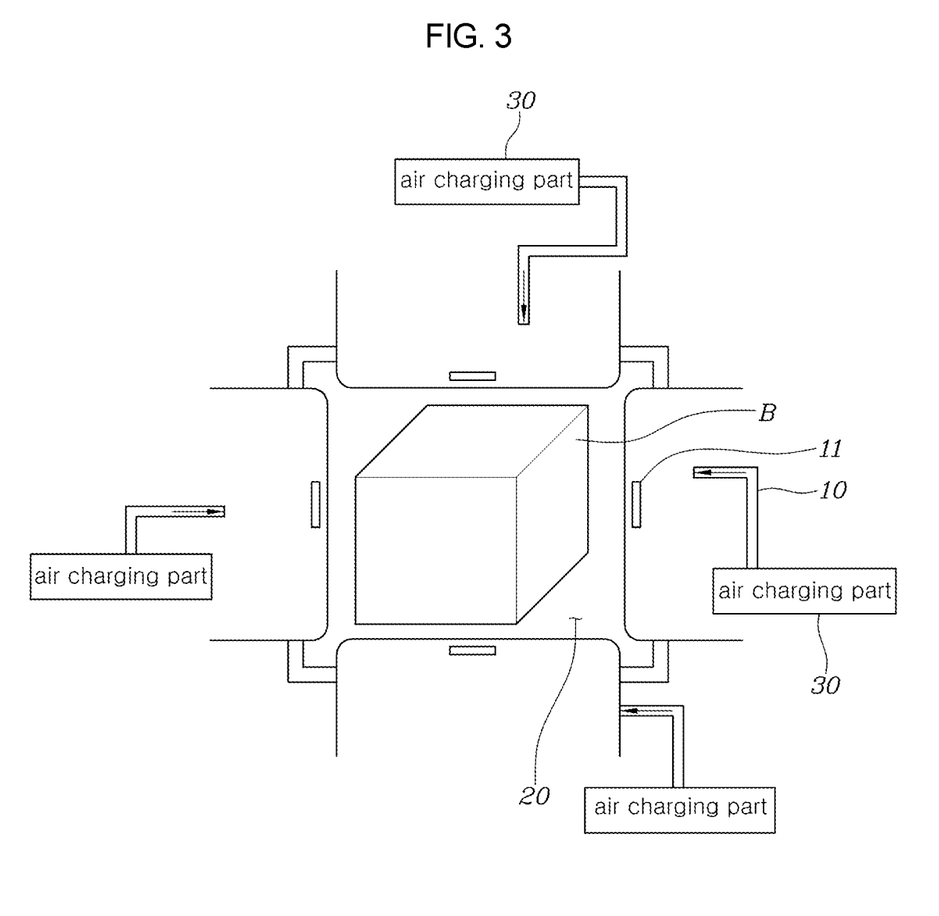
FIG. 3 is a view showing the cargo packaging system for the mobility vehicle, the system having the plurality of air cushions independent from each other according to the exemplary embodiment of the present invention.
Figure 4:
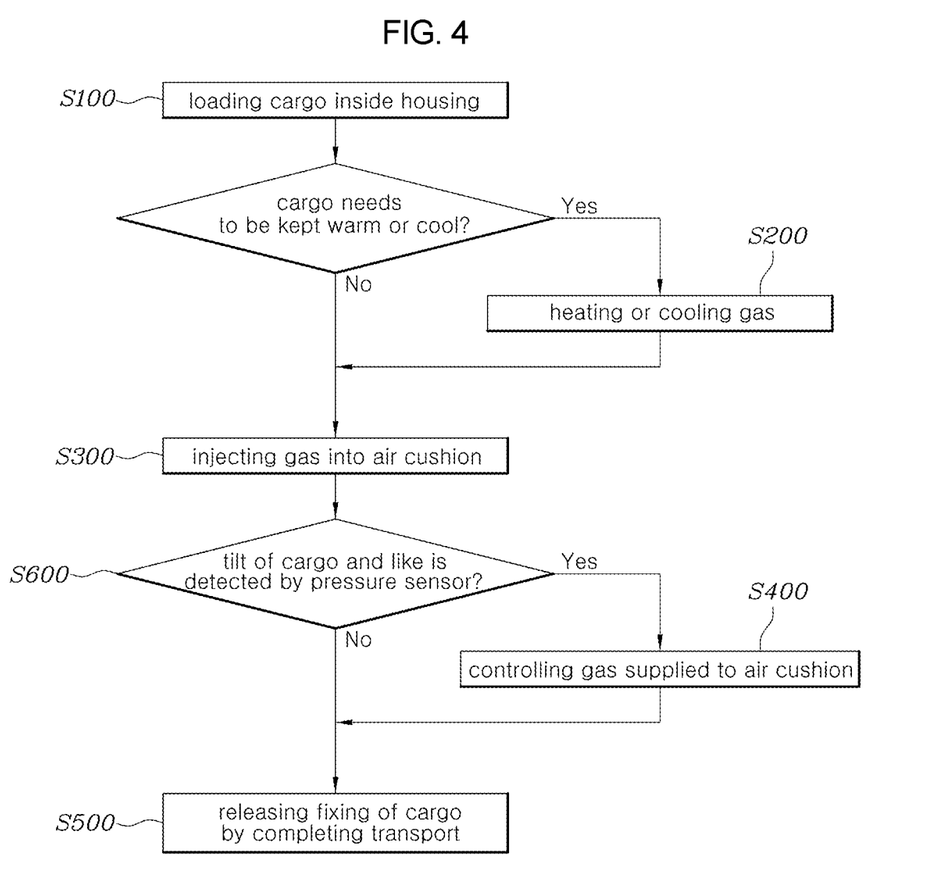
FIG. 4 is a flowchart showing a control method for a cargo packaging system for a mobility vehicle of the present invention.

FIG. 1 is a view showing a cargo packaging system for a mobility vehicle, the system being applied to an air mobility vehicle according to various exemplary embodiments of the present invention, FIG. 2 is a view showing the cargo packaging system for the mobility vehicle, the system having a plurality of air cushions connected to each other according to the exemplary embodiment of the present invention, FIG. 3 is a view showing the cargo packaging system for the mobility vehicle, the system having the plurality of air cushions independent from each other according to the exemplary embodiment of the present invention, and FIG. 4 is a flowchart showing a control method for a cargo packaging system for a mobility vehicle of the present invention.

Referring to the cargo packaging system applied to the air mobility vehicle A, according to the exemplary embodiment of the present invention with reference to FIG. 1, the cargo packaging system for the mobility vehicle includes: a housing 20 having an internal space accommodating cargo B and mounted on the mobility vehicle A; a plurality of air cushions 10 provided at a plurality of positions on an internal surface of the housing, and applying a pressure to and cushioning the cargo accommodated in the interior of the housing in a plurality of directions during expansion thereof; an air charging part 30 for injecting gas into each air cushion 10 of the housing and controlling a flow rate or pressure of the injected gas; and an outlet controlled by the air charging part 30 and for discharging the gas injected into each air cushion 10.

The mobility vehicle A refers to a means of transport, and people or cargo may be transported through the mobility vehicle A. An urban mobility vehicle is operated on the ground, but due to the recent development of battery technology, research and development on an air mobility vehicle configured for travelling beyond the limits of the ground has been actively promoted.

There is a strong trend of operating a mobility vehicle unmanned by incorporating autonomous driving technology to reduce labor costs, etc. Accordingly, using such a mobility vehicle may speed up the transportation of cargo, etc. However, in a case where cargo may be broken because the mobility vehicle unmanned has to autonomously load its own cargo, when the cargo is loaded in an unstable condition, the condition of the cargo may not be guaranteed after the transportation is completed. Accordingly, to stably transport cargo to a destination in an unmanned way, when the mobility vehicle is provided with components including: the housing 20 for accommodating the cargo in the interior of the mobility vehicle; the air cushions 10 for surrounding and fixing the housing; the air charging part 30 for injecting gas into each air cushion; and the outlet for discharging the gas filled into each air cushion to release the fixing of the cargo, various cargoes may be stably transported even though the cargo packaging system is operated unmanned. When the air cushion 10 made of a tough material and filled with a fluid such as air is provided, more stable transport is possible by securing the cargo in all directions with an appropriate pressure. When the cargo arrives at its destination, transport is completed by discharging the gas through the outlet of the air cushion, releasing the fixing, and unloading the cargo.

Furthermore, the mobility vehicle A may further include a heat exchanger 40 for heating or cooling the gas injected into each air cushion 10 through heat exchange.

The cargo accommodated in the housing of the mobility vehicle may be the cargo requiring special heating or cooling. In general, in a case where cargo needs to be kept warm and cold, a heat insulating agent or refrigerant is packed with the cargo together when packing the cargo, but when the gas injected into the air cushion is heated or cooled through the heat exchanger 40, the temperature of the cargo being transported may be controlled. The present method may be suitable for use when transporting cargo such as food ingredients and produce. Accordingly, it is preferable to apply the air cushion with a membrane material configured for slowly discharging a portion of gas rather than with a material configured for sealing. For example, the air cushion may be made of a material such as polyester.

Furthermore, a temperature sensor may be provided in the interior of the housing or inside the air cushion, and the heat exchanger 40 may control the degree of heating or cooling depending on values of the temperature measured by the temperature sensor.

There is the temperature which may be maintained for each cargo to be transported, so that the temperature sensor for measuring the temperature of the gas may be provided inside the air cushion to keep the temperature constant. When the temperature is too high or low, the charged gas is partially discharged to the outside through the outlet of the air cushion, and then the cooled or heated gas is injected into the air cushion, controlling the temperature of the gas.

A cooler for cooling the supplied gas may be provided between the air charging part 30 and the air cushion 10, and a heating element may be provided in each air cushion at a portion thereof in contact with the cargo.

As above, the present configuration is provided for controlling the temperature of the cargo, but there is a difference in that the cooler may only perform cooling for the injected gas and the heating is performed by the heating element provided in the air cushion. It is preferable for the cooler to be configured to cool the gas at a position of the heat exchanger. When the above configuration is used, the temperature of the gas in the air cushion may be controlled by use of the heating element without discharging the gas filled in the air cushion. That is, for the cargo whose temperature may be kept high, it is appropriate to include both the cooler for cooling the injected gas and the heating element for heating the gas injected into the air cushion.

The housing 20 is mounted in the internal space of the mobility vehicle A. At a lower portion of the mobility vehicle, the air charging part 30 may be provided below a point where the housing 20 is positioned. The mobility vehicle A may further include a gas storage tank 50 that stores gas to be injected into the air cushion 10 and supplies the gas to the air charging part 30.

The gas to be filled into the air cushion may be various. When it does not matter whether the cargo is transported at room temperature or not, the air outside the mobility vehicle is preferably used. However, when the cargo being transported may avoid contact with highly reactive oxygen in the air as much as possible, it is preferable to use an inert gas such as helium. The gas storage tank may store the inert gas, and in some cases, external air. That is, the gas storage tank allows various cargoes to be accommodated in the housing by varying the gas to be stored depending on situations.

Meanwhile, one or more of the plurality of air cushions are connected to the air charging part to receive gas, and the plurality of air cushions are connected to each other, having the same internal pressure thereof.

FIG. 2 is the view showing the cargo packaging system for the mobility vehicle, the system having the plurality of air cushions connected to each other according to the exemplary embodiment of the present invention. Referring to FIG. 2, only one or more of the plurality of air cushions are connected to the air charging part 30, to receive the gas supplied from the air charging part. In the instant case, even though the air charging part is configured as a single portion, the air charging part is connected to each of the air cushions 10 so that all the air cushions have the same pressure, and since the air charging part is a single part, costs may be reduced and the system may be simplified. Even when any one side of the cargo is tilted sharply and the pressure of the air cushion that comes in contact with the cargo increases momentarily, since all the air cushions are connected to each other, the increased pressure decreases within a short time period, and thus the air cushion that comes in contact with the cargo is in equilibrium with other air cushions.

It is possible for the plurality of air cushions 10 to be independent cushions that are not connected to each other, and each of the air cushions may be allowed to receive gas independently from the air charging part 30.

FIG. 3 is the view showing the cargo packaging system for the mobility vehicle, the system having the plurality of air cushions independent from each other according to the exemplary embodiment of the present invention. Referring to FIG. 3, the plurality of air cushions may be individually connected to the plurality of air charging parts. Since such a configuration may allow the pressure of the air cushion to be independently controlled, the cargo may be transported more stably by varying the pressure of the air cushion and controlling each of the air cushions depending on the situations.

Furthermore, a pressure sensor 11 may be provided in the plurality of air cushions, and the air charging part 30 may control the gas supplied to each air cushion 10 depending on the internal pressure of each air cushion.

In an exemplary embodiment of the present invention, the plurality of air charging parts 30 is connected to a gas storage tank 50 in common, or each air charging parts 30 is connected to a corresponding gas storage tank 50 among a plurality of gas storage tanks 50.

As shown in FIG. 2 and FIG. 3, the pressure sensor may be provided inside the air cushion. The pressure sensor detects an increased or decreased pressure of the air cushion and transmits the detected information to the air charging part controlling the air cushion. The air charging part determines an abnormal condition such as tilt of the cargo, to increase the pressure by supplying more gas to the air cushion or decrease the pressure of the air cushion through the outlet, recovering the abnormal condition of the cargo. An air mobility vehicle may have a situation in which the cargo is tilted sharply by the fuselage's shaking due to turbulence in the air, and in the instant case, the pressure sensor instantaneously detects the increased pressure, and the air charging part controls the air cushion on the side of the tilted cargo by use of the received information, recovering the original position of the loaded cargo.

Whether the plurality of air cushions is provided being connected or the plurality of air cushions is provided being independent, each air cushion has a pressure sensor to stably manage the cargo.

Hereinafter, a control method for a cargo packaging system for a mobility vehicle according to various exemplary embodiments of the present invention will be described.

FIG. 4 is the flowchart showing the control method for the cargo packaging system for the mobility vehicle, of which system is the present invention. Referring to FIG. 4, as the control method for the cargo packaging system for the mobility vehicle of claim 1, the control method includes: step S100 of loading cargo in an internal space of a housing; step S300 of injecting gas into an air cushion through an air charging part and fixing the cargo inside the housing; and step S500 of releasing the fixing of the cargo by discharging the gas injected into the air cushion through an outlet when transportation of the cargo is completed.

In an unmanned mobility vehicle that transports cargo, a user directly loads the cargo into the housing, or the mobility vehicle automatically loads the cargo into the housing inside the mobility vehicle. For example, when a mobility user packs and loads the cargo well on a designated place, the mobility vehicle may perform a step of accommodating the cargo. The size of the cargo loaded inside the housing may vary, and the cargo may be stably fixed by way of injecting gas into the air cushion provided to accommodate various cargo. That is, since fluid has nonstationary property, regardless of the size and shape of the cargo, the fluid may stably wrap and fix the cargo.

Meanwhile, the control method for the cargo packaging system for the mobility vehicle may further include: step S200 of heating or cooling the gas through a heat exchanger included in the mobility vehicle.

When the cargo may be transported in a room temperature or may be transported regardless of the temperature, the temperature of the gas injected into the air cushion is not a consideration, but when the cargo being transported is sensitive to a temperature condition, it is necessary to maintain an appropriate temperature. Therefore, by identifying whether the cargo needs to be kept warm or cool according to temperature information related to the cargo, etc., and controlling the temperature of the injected gas by use of the heat exchanger, etc., the cargo may be transported stably, and further the cargo sensitive to the temperature condition may be transported as well, facilitating various types of cargo to be transported.

The cargo packaging system for the mobility vehicle may further include: step S600 of detecting a change of a pressure in each air cushion by a pressure sensor provided in each of the plurality of air cushions; and step S400 of controlling the gas supplied to each air cushion depending on the pressure inside of each air cushion by the air charging part.

In a case where a large impact is applied to the mobility vehicle due to an unexpected collision or turbulence, the cargo may be tilted, and accordingly, the pressure inside the air cushion may increase momentarily. Therefore, the pressure sensor detects the increased pressure and transmits the pressure information to the air charging part, and according to the received pressure information, the air charging part identifies the abnormal condition such as the tilt of the cargo and controls the flow rate or pressure of the gas supplied to the air cushion, recovering the abnormal condition of the cargo.

In an exemplary embodiment of the present invention, a controller is connected to at least one of the elements of the mobility vehicle such as the air charging part 30 but not limited thereto, to control the operations thereof.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cargo packaging system for a mobility vehicle, the system comprising:
   a housing having an internal space therein for accommodating cargo and mounted on the mobility vehicle;
   a plurality of air cushions provided at a plurality of positions on an internal surface of the housing, and applying a pressure to and cushioning the cargo accommodated in the housing in a plurality of directions during expansion thereof;
   an air charging part connected to the plurality of air cushions and configured for injecting gas into each air cushion of the housing and controlling a flow rate or a pressure of the injected gas;
   an outlet controlled by the air charging part and discharging the gas injected into each air cushion to the outside of the outlet; and
   a heat exchanger for heating or cooling the gas injected into each air cushion through heat exchange,
   wherein the heat exchanger is mounted downstream of the air charging part.

2. The system of claim 1, further including a temperature sensor provided inside the housing or in each air cushion, wherein the heat exchanger controls a degree of heating or cooling according to values of temperature measured by the temperature sensor.

3. The system of claim 1, further including:
a cooler configured for cooling the gas and provided between the air charging part and each air cushion, and
a heating element provided in each air cushion at a portion thereof in contact with the cargo.

4. The system of claim 1,
wherein the housing is mounted in an internal space of the mobility vehicle, and
wherein at a lower portion of the mobility vehicle, the air charging part is provided below a point where the housing is positioned.

5. The system of claim 1, further including a gas storage tank that stores the gas to be injected into each air cushion and supplies the gas to the air charging part connected to the gas storage tank.

6. The system of claim 1,
wherein at least one of the plurality of air cushions is connected to the air charging part to receive the gas, and
wherein the plurality of air cushions is connected to each other, to have a same internal pressure by the gas.

7. The system of claim 6, wherein the plurality of air cushions is connected to each other in series.

8. The system of claim 1,
wherein the air charging part is in plural to include a plurality of air charging parts,
wherein the plurality of air cushions is independent air cushions that are not connected to each other, and
wherein each air cushion independently receives the gas from each corresponding air charging part among the plurality of air charging parts.

9. The system of claim 8, further including a gas storage tank that stores the gas to be injected into each air cushion and supplies the gas to the plurality of air charging parts connected to the gas storage tank in common.

10. The system of claim 8, further including a plurality of gas storage tanks that store the gas to be injected into a corresponding air cushion among the plurality of air cushions and supplies the gas to a corresponding air charging part among the plurality of air charging parts.

11. The system of claim 1, further including a pressure sensor provided in each of the plurality of air cushions,
wherein the air charging part is configured to control the gas supplied to each air cushion according to an internal pressure of each air cushion, to adjust a condition of the cargo.

12. A method of controlling a cargo packaging system for a mobility vehicle of claim 1, the method including:
loading the cargo in the internal space of the housing;
injecting the gas into the plurality of air cushions through the air charging part and fixing the cargo inside the housing; and
releasing the fixing of the cargo by discharging the gas injected into the air cushion through the outlet when transportation of the cargo is completed,
wherein the method further includes heating or cooling the gas through the heat exchanger included in the mobility vehicle, and
wherein the heat exchanger is mounted downstream of the air charging part.

13. The method of claim 12, further including:
detecting a change of a pressure in each air cushion by a pressure sensor provided in each of the plurality of air cushions; and
controlling, by the air charging part, the gas supplied to each air cushion depending on the pressure inside of each air cushion.

14. The method of claim 12, wherein the plurality of air cushions is connected to each other in series.

15. The method of claim 12,
wherein the air charging part is in plural to include a plurality of air charging parts,
wherein the plurality of air cushions is independent air cushions that are not connected to each other, and
wherein each air cushion independently receives the gas from each corresponding air charging part among the plurality of air charging parts.

16. A cargo packaging system for a mobility vehicle, the system comprising:
a housing having an internal space therein for accommodating cargo and mounted on the mobility vehicle;
a plurality of air cushions provided at a plurality of positions on an internal surface of the housing, and applying a pressure to and cushioning the cargo accommodated in the housing in a plurality of directions during expansion thereof;
an air charging part connected to the plurality of air cushions and configured for injecting gas into each air cushion of the housing and controlling a flow rate or a pressure of the injected gas;
an outlet controlled by the air charging part and discharging the gas injected into each air cushion to the outside of the outlet;
a cooler configured for cooling the gas and provided between the air charging part and each air cushion, and
a heating element provided in each air cushion at a portion thereof in contact with the cargo.

* * * * *